US011577852B2

(12) United States Patent
O'Connor et al.

(10) Patent No.: US 11,577,852 B2
(45) Date of Patent: Feb. 14, 2023

(54) FUEL OXYGEN CONVERSION UNIT

(71) Applicant: General Electric Company, Schenectady, NY (US)

(72) Inventors: Ethan Patrick O'Connor, Hamilton, OH (US); Daniel Alan Niergarth, Norwood, OH (US); Arthur William Sibbach, Boxford, MA (US); Brandon Wayne Miller, Liberty Township, OH (US); Richard Alan Wesling, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 16/178,947

(22) Filed: Nov. 2, 2018

(65) Prior Publication Data

US 2020/0140110 A1    May 7, 2020

(51) Int. Cl.
| | | |
|---|---|---|
| *B64D 37/34* | (2006.01) | |
| *F02M 37/22* | (2019.01) | |
| *F02C 7/22* | (2006.01) | |
| *F02C 7/232* | (2006.01) | |
| *B01D 19/00* | (2006.01) | |
| *F02C 7/224* | (2006.01) | |

(52) U.S. Cl.
CPC ............. *B64D 37/34* (2013.01); *F02C 7/222* (2013.01); *F02C 7/232* (2013.01); *F02M 37/22* (2013.01); *B01D 19/00* (2013.01); *B01D 2257/104* (2013.01); *F02C 7/224* (2013.01); *F05D 2210/13* (2013.01)

(58) Field of Classification Search
CPC ......... B64D 37/34; F02M 37/22; F02C 7/232; F02C 7/22
See application file for complete search history.

(56) References Cited

U.S. PATENT DOCUMENTS

| | | | |
|---|---|---|---|
| 2,582,842 | A | 1/1952 | Messinger |
| 2,720,313 | A | 10/1955 | Pattison |
| 2,893,628 | A | 7/1959 | Herman |
| 3,050,240 | A | 8/1962 | Darnell |
| 3,178,105 | A | 4/1965 | Darnell |
| 3,590,559 | A | 7/1971 | Bragg |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

U.S. Appl. No. 15/819,327, filed Nov. 28, 2017.

(Continued)

*Primary Examiner* — Youngsul Jeong
(74) *Attorney, Agent, or Firm* — Dority & Manning, P.A.

(57) ABSTRACT

A fuel oxygen conversion unit for a vehicle or an engine of the vehicle includes a contactor; a mechanically-driven, first fuel gas separator defining a liquid fuel outlet and a stripping gas outlet, the fuel oxygen conversion unit defining a liquid fuel outlet path in fluid communication with the liquid fuel outlet of the first fuel gas separator; and a second fuel gas separator positioned in fluid communication with the liquid fuel outlet path at a location downstream of the first fuel gas separator.

20 Claims, 6 Drawing Sheets

(56) References Cited

U.S. PATENT DOCUMENTS

| | | | |
|---|---|---|---|
| 3,847,298 A | 11/1974 | Hamilton | |
| 3,895,243 A | 7/1975 | Amend et al. | |
| 3,902,658 A | 9/1975 | Madsen | |
| 4,169,567 A | 10/1979 | Tamura | |
| 4,170,116 A | 10/1979 | Williams | |
| 4,449,372 A | 5/1984 | Rilett | |
| 4,503,682 A | 3/1985 | Rosenblatt | |
| 4,505,124 A | 3/1985 | Mayer | |
| 4,550,573 A | 11/1985 | Rannenberg | |
| 4,600,413 A | 7/1986 | Sugden | |
| 4,714,139 A | 12/1987 | Lorenz et al. | |
| 4,738,779 A | 4/1988 | Carroll et al. | |
| 4,755,197 A | 7/1988 | Benson et al. | |
| 4,773,212 A | 9/1988 | Griffin et al. | |
| 5,149,018 A | 9/1992 | Clark | |
| 5,267,608 A | 12/1993 | Coffinberry | |
| 5,341,636 A | 8/1994 | Paul | |
| 5,452,573 A | 9/1995 | Glickstein et al. | |
| 5,587,068 A | 12/1996 | Aho, Jr. et al. | |
| 5,622,621 A | 4/1997 | Kramer | |
| 5,667,168 A | 9/1997 | Fluegel | |
| 5,722,241 A | 3/1998 | Huber | |
| 5,724,806 A | 3/1998 | Homer | |
| 5,904,836 A | 5/1999 | Lee et al. | |
| 6,134,876 A | 10/2000 | Hines et al. | |
| 6,182,435 B1 | 2/2001 | Niggemann et al. | |
| 6,250,097 B1 | 6/2001 | Lui et al. | |
| 6,294,091 B1 | 9/2001 | Hoff | |
| 6,415,595 B1 | 7/2002 | Wilmot, Jr. et al. | |
| 6,435,454 B1 | 8/2002 | Engelhardt | |
| 6,701,717 B2 | 3/2004 | Flatman et al. | |
| 6,702,729 B2 | 3/2004 | Mazzuca | |
| 6,892,710 B2 | 5/2005 | Ekstam | |
| 6,939,392 B2 | 9/2005 | Huang et al. | |
| 7,093,437 B2 | 8/2006 | Spadaccini et al. | |
| 7,260,926 B2 | 8/2007 | Sabatino et al. | |
| 7,334,407 B2 | 2/2008 | Spadaccini et al. | |
| 7,377,098 B2 | 5/2008 | Walker et al. | |
| 7,387,602 B1 | 6/2008 | Kirsch | |
| 7,398,641 B2 | 7/2008 | Stretton et al. | |
| 7,431,818 B2 | 10/2008 | Cipollini | |
| 7,459,081 B2 | 12/2008 | Koenig et al. | |
| 7,536,851 B2 | 5/2009 | McLain | |
| 7,569,099 B2 | 8/2009 | Coffin et al. | |
| 7,628,965 B2 | 12/2009 | Johnson et al. | |
| 7,694,916 B2 | 4/2010 | Limaye et al. | |
| 7,735,670 B2 | 6/2010 | Zaki et al. | |
| 7,744,827 B2 | 6/2010 | Vanderspurt et al. | |
| 7,824,470 B2 | 11/2010 | Chiappetta et al. | |
| 7,836,680 B2 | 11/2010 | Schwarz et al. | |
| 7,882,704 B2 | 2/2011 | Chen | |
| 7,896,292 B2 | 3/2011 | Limaye et al. | |
| 7,905,259 B2 | 3/2011 | Johnson et al. | |
| 7,966,807 B2 | 6/2011 | Norris et al. | |
| 7,987,676 B2 | 8/2011 | Ast et al. | |
| 8,055,437 B2 | 11/2011 | Proietty et al. | |
| 8,141,360 B1 | 3/2012 | Huber | |
| 8,177,884 B2 | 5/2012 | Schmidt et al. | |
| 8,231,714 B2 | 7/2012 | Cornet et al. | |
| 8,261,528 B2 | 9/2012 | Chillar et al. | |
| 8,388,830 B2 | 3/2013 | Sohn et al. | |
| 8,450,020 B2 | 5/2013 | Sinha et al. | |
| 8,499,567 B2 | 8/2013 | Hagh et al. | |
| 8,499,822 B2 | 8/2013 | Bulin et al. | |
| 8,522,572 B2 | 9/2013 | Coffinberry et al. | |
| 8,602,362 B2 | 12/2013 | Buchwald | |
| 8,663,996 B2 | 3/2014 | Beeson | |
| 8,765,070 B2 | 7/2014 | Norton et al. | |
| 8,789,377 B1 | 7/2014 | Brostmeyer | |
| 8,821,362 B2 | 9/2014 | Kidd et al. | |
| 8,828,344 B2 | 9/2014 | K-WLam et al. | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,144,768 B2 | 9/2015 | Tichbome et al. | |
| 9,162,162 B2 | 10/2015 | Yount | |
| 9,231,267 B2 | 1/2016 | McAlister | |
| 9,364,780 B2* | 6/2016 | Shin | B01J 19/1887 |
| 9,435,246 B2 | 9/2016 | Devarakonda | |
| 9,567,095 B2 | 2/2017 | McCarthy et al. | |
| 9,580,185 B2 | 2/2017 | Rhoden et al. | |
| 9,656,187 B2 | 5/2017 | Lo et al. | |
| 9,687,773 B2* | 6/2017 | Johnson | B01D 19/0005 |
| 9,724,625 B2 | 8/2017 | Lo | |
| 9,752,507 B2 | 9/2017 | Selstad et al. | |
| 9,771,867 B2 | 9/2017 | Karam et al. | |
| 9,834,315 B2 | 12/2017 | Lo et al. | |
| 9,863,322 B2 | 1/2018 | Williams | |
| 9,885,290 B2 | 2/2018 | Della-Fera et al. | |
| 9,897,054 B2 | 2/2018 | Lo et al. | |
| 10,563,140 B2 | 2/2020 | Lajeunesse et al. | |
| 2005/0137441 A1 | 6/2005 | Cordatos et al. | |
| 2006/0064954 A1* | 3/2006 | Yokota | B01D 19/0052 |
| | | | 55/406 |
| 2008/0083608 A1* | 4/2008 | Cipollini | B01D 19/0031 |
| | | | 204/157.5 |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2011/0262309 A1 | 10/2011 | Limaye et al. | |
| 2012/0216502 A1 | 8/2012 | Freund et al. | |
| 2012/0216677 A1 | 8/2012 | Koenig et al. | |
| 2013/0186100 A1 | 7/2013 | Rhoden et al. | |
| 2014/0165570 A1 | 6/2014 | Herring | |
| 2014/0205446 A1 | 7/2014 | Patsouris et al. | |
| 2014/0252171 A1* | 9/2014 | Dooley | B64D 37/32 |
| | | | 244/129.2 |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0072850 A1 | 3/2015 | Derrick et al. | |
| 2015/0159867 A1 | 6/2015 | Patrick et al. | |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0138431 A1 | 5/2016 | Lear, Jr. | |
| 2016/0167802 A1* | 6/2016 | Lo | B01D 19/0068 |
| | | | 96/187 |
| 2016/0208759 A1 | 7/2016 | Lo et al. | |
| 2016/0245144 A1 | 8/2016 | Selberg et al. | |
| 2016/0290214 A1 | 10/2016 | Ekanayake et al. | |
| 2016/0305440 A1 | 10/2016 | Laboda et al. | |
| 2016/0369700 A1 | 12/2016 | Ribarov et al. | |
| 2017/0030266 A1 | 2/2017 | Cerny et al. | |
| 2017/0096910 A1 | 4/2017 | Raimarckers et al. | |
| 2017/0113807 A1 | 4/2017 | Burnell et al. | |
| 2017/0114721 A1 | 4/2017 | Miller et al. | |
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0291714 A1 | 10/2017 | Corman | |
| 2018/0016025 A1 | 1/2018 | Rheaume et al. | |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2020/0086239 A1 | 3/2020 | Cordatos et al. | |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |

(56) References Cited

FOREIGN PATENT DOCUMENTS

| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php, Publication Date: Feb. 21, 2018.

* cited by examiner

FUEL OXYGEN CONVERSION UNIT

FIELD

The present subject matter relates generally to a fuel oxygen conversion unit for an engine or vehicle with a reduced gas-content liquid outlet.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose. Certain of these fuel oxygen conversion systems may introduce a stripping gas to absorb or otherwise react with the fuel to reduce an oxygen content of the fuel. However, if not properly removed, excess gas in the fuel system provided to the combustion section can cause undesirable results, such as undesirable combustion dynamics.

Accordingly, a fuel oxygen conversion system configured to reduce an amount of gas in the deoxygenated fuel provided to a combustion section of an engine would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen conversion unit is provided for a vehicle or an engine of the vehicle. The fuel oxygen conversion unit includes a contactor; a mechanically-driven, first fuel gas separator defining a liquid fuel outlet and a stripping gas outlet, the fuel oxygen conversion unit defining a liquid fuel outlet path in fluid communication with the liquid fuel outlet of the first fuel gas separator; and a second fuel gas separator positioned in fluid communication with the liquid fuel outlet path at a location downstream of the first fuel gas separator.

In certain exemplary embodiments the fuel oxygen conversion unit further defines a circulation gas flowpath in fluid communication with the stripping gas outlet of the first fuel gas separator and extending from the fuel gas separator to the contactor, wherein the second fuel gas separator defines a liquid fuel outlet and a stripping gas outlet, wherein the stripping gas outlet of the second fuel gas separator is in fluid communication with the circulation gas flowpath.

In certain exemplary embodiments the first fuel gas separator is a rotary separator.

In certain exemplary embodiments the second fuel gas separator is a mechanically-driven fuel gas separator.

The fuel oxygen conversion unit of claim 4, wherein the second fuel gas separator is mechanically coupled to, and rotatable with, the first fuel gas separator.

In certain exemplary embodiments the second fuel gas separator is a cyclonic separator.

In certain exemplary embodiments the second fuel gas separator includes a tank defining a vertical direction, wherein the tank defines a stripping gas outlet and liquid fuel outlet, wherein the stripping gas outlet is positioned above the liquid fuel outlet along the vertical direction.

For example, in certain exemplary embodiments the tank defines an interior and includes one or more baffles positioned within the interior.

For example, in certain exemplary embodiments the liquid fuel outlet is positioned below at least one of the one or more baffles of the tank along the vertical direction.

In certain exemplary embodiments the second fuel gas separator is a passive separator.

For example, in certain exemplary embodiments the second fuel gas separator is a gravity separator, and wherein the gravity separator includes a Y-pipe defining an inlet, a liquid fuel outlet, and a stripping gas outlet.

For example, in certain exemplary embodiments the Y-pipe further defines a vertical direction, and wherein the liquid fuel outlet is positioned below the stripping gas outlet along the vertical direction.

In certain exemplary embodiments the fuel oxygen conversion unit further defines a circulation gas flowpath in fluid communication with the stripping gas outlet of the first fuel gas separator and extending from the fuel gas separator to the contactor, and wherein the fuel oxygen conversion unit further includes a gas boost pump positioned in the circulation gas flowpath; and a catalyst positioned in the circulation gas flowpath.

The fuel oxygen conversion unit of claim 13, wherein the gas boost pump is mechanically coupled to, and rotatable with, the first fuel gas separator.

In another exemplary embodiment of the present disclosure an engine is provided. The engine includes a combustion section; a fuel delivery system in fluid communication with the combustion section for providing fuel to the combustion section; and a fuel oxygen conversion unit in fluid communication with the fuel delivery system. The fuel oxygen conversion unit includes a contactor defining an inlet in fluid communication with the fuel delivery system; and a first fuel gas separator defining a liquid fuel outlet and a stripping gas outlet, the fuel oxygen conversion unit defining a circulation gas flowpath in fluid communication with the stripping gas outlet of the first fuel gas separator and extending from the fuel gas separator to the contactor, and further defining a liquid fuel outlet path in fluid communication with the liquid fuel outlet of the first fuel gas separator and the fuel delivery system. The fuel oxygen conversion unit also includes a second fuel gas separator positioned in fluid communication with the liquid fuel outlet path at a location downstream of the first fuel gas separator.

In certain exemplary embodiments the fuel oxygen conversion unit further defines a circulation gas flowpath in fluid communication with the stripping gas outlet of the first fuel gas separator and extending from the fuel gas separator to the contactor, wherein the second fuel gas separator defines a liquid fuel outlet and a stripping gas outlet, wherein the stripping gas outlet of the second fuel gas separator is in fluid communication with the circulation gas flowpath.

In certain exemplary embodiments the second fuel gas separator is a cyclonic separator.

In certain exemplary embodiments the second fuel gas separator includes a tank defining a vertical direction, wherein the tank defines a stripping gas outlet and liquid fuel outlet, wherein the stripping gas outlet is positioned above the liquid fuel outlet along the vertical direction.

In certain exemplary embodiments the fuel oxygen conversion unit further defines a circulation gas flowpath in fluid communication with the stripping gas outlet of the first fuel gas separator and extending from the fuel gas separator to the contactor, and wherein the fuel oxygen conversion unit further includes a gas boost pump positioned in the circulation gas flowpath and a catalyst positioned in the circulation gas flowpath.

For example, in certain exemplary embodiments the gas boost pump is mechanically coupled to, and rotatable with, the first fuel gas separator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
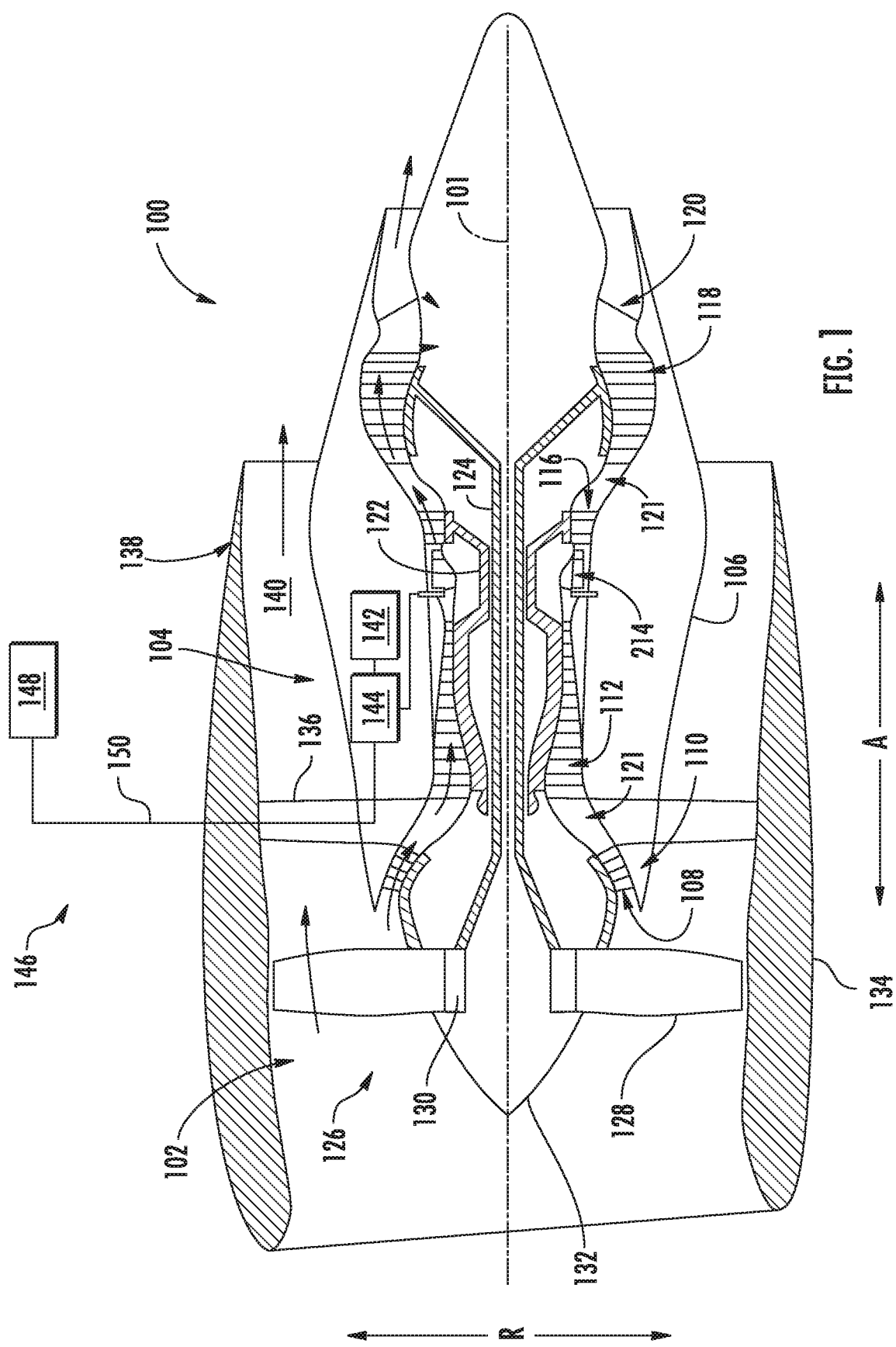
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen conversion unit 144 positioned within the turbomachine 104, i.e., within the casing 106 of the turbomachine 104, in other embodiments, the fuel oxygen conversion unit 144 may be positioned at any other suitable location. For example, in other embodiments, the fuel oxygen conversion unit 144 may instead be positioned remote from the turbofan engine 100, such as proximate to, or within, the tank 148 of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc.

Figure 2:
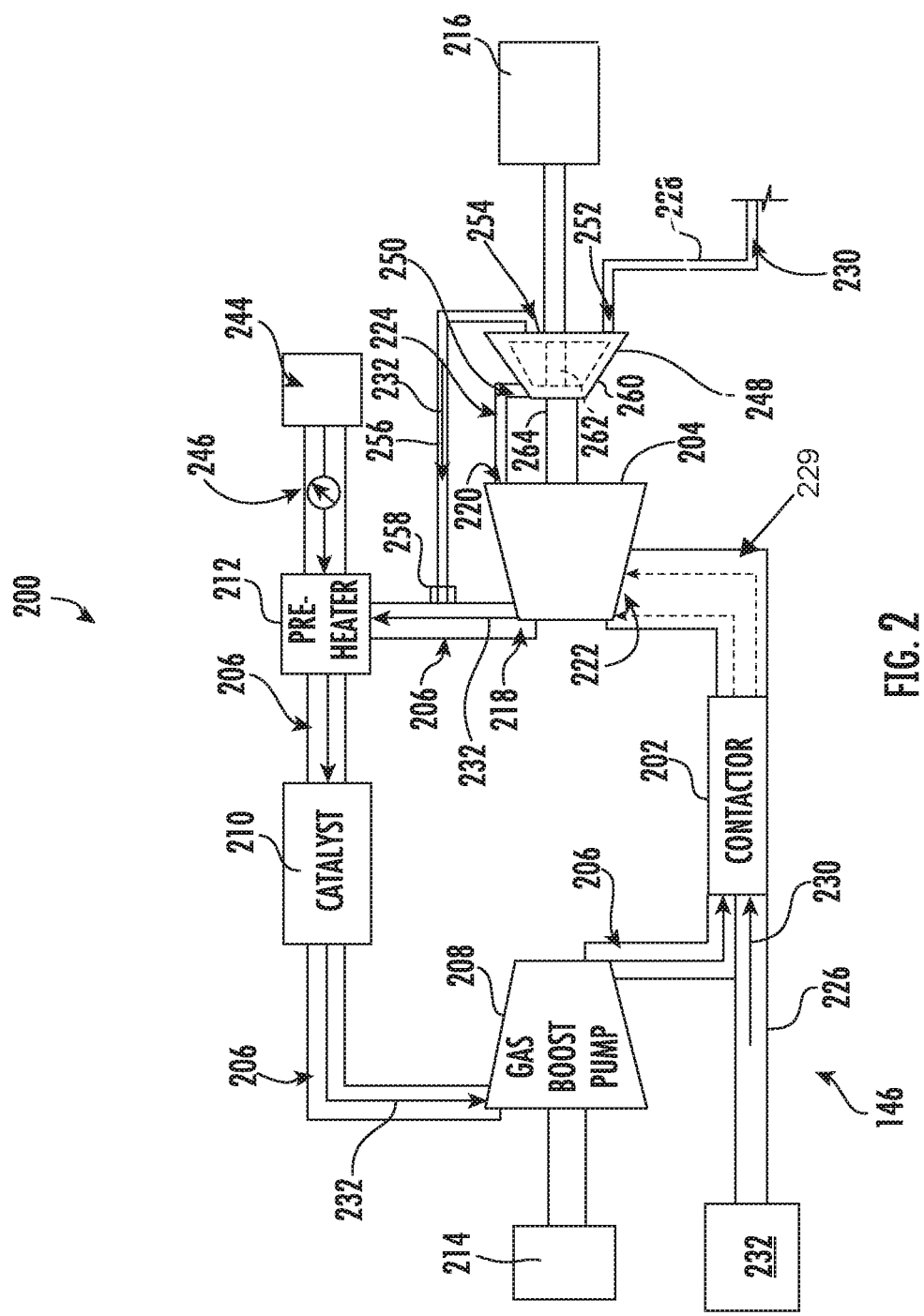
FIG. 2 is a schematic, cross-sectional view of a fuel oxygen conversion unit in accordance with an exemplary embodiment of the present disclosure.

Referring now to FIG. 2, schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202 and a fuel gas separator 204. Additionally, the exemplary fuel oxygen conversion unit 200 defines a circulation gas flowpath 206 extending from the fuel gas separator 204 to the contactor 202. In certain exemplary embodiments, the circulation gas flowpath 206 may be formed of any combination of one or more conduits, tubes, pipes, etc., as well as structures of components within the circulation gas flowpath 206.

As will be explained in greater detail, below, the fuel oxygen conversion unit 200 generally provides for a flow of stripping gas 220 through the stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Moreover, for the exemplary fuel oxygen conversion unit 200 depicted in FIG. 2, the fuel oxygen conversion unit 200 further includes a gas boost pump 208, a catalyst 210, and a pre-heater 212. For the embodiment shown, the gas boost pump 208, the catalyst 210, and the pre-heater 212 are each arranged in series flow within the circulation gas flowpath 206. It will be appreciated, however, that in other embodiments, the oxygen conversion unit 200 may not define the circulation gas flowpath 206, and instead a stripping gas flow may come from an open loop source. Additionally, in other embodiments, the listed components may be provided in any suitable flow order.

Referring still to the embodiment depicted, the gas boost pump 208 is configured as a rotary gas pump mechanically coupled to, and driven by a power source, which for the embodiment shown is a first pad 214 of an accessory gearbox (such as accessory gearbox 142 of FIG. 1). Notably, as will be described in greater detail, below, the fuel gas separator 204 is similarly a mechanically-driven fuel gas separator 204 mechanically coupled to, and driven by, a power source. For the embodiment of FIG. 2, the power source driving the fuel gas separator 204 is separate from the power source driving the gas boost pump 208. Specifically, for the embodiment of FIG. 2, the power source driving the fuel gas separator 204 is a second pad 216 of the accessory gearbox. However, in other embodiments, the gas boost pump 208 may be configured in any other suitable manner. For example, in other embodiments, the gas boost pump 208 may be mechanically connected to, and rotatable with, the fuel gas separator 204 (see, e.g., the exemplary embodiments of FIGS. 4 through 6, described below). Additionally, or alternatively, in other exemplary embodiments the power source driving the gas boost pump 208, the power source driving the fuel gas separator 204, or both may be one or more electric machines or other power source(s).

As will be explained in more detail below, for the embodiment of FIG. 2, it will be appreciated that the fuel gas separator 204 is a first fuel gas separator 204 and generally defines a gas outlet 218, a liquid fuel outlet 220, and an inlet 222. In addition, the fuel oxygen conversion unit 200 further defines a liquid fuel outlet path 224. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines, and in particular, an inlet fuel line 226 and an outlet fuel line 228. The inlet fuel line 226 is fluidly connected to the contactor 202 for providing a flow of liquid fuel 230 to the contactor 202 (e.g., from a fuel source 232, such as a fuel tank). Additionally, the liquid fuel outlet 220 of the first fuel gas separator 204 is fluidly connected to the liquid fuel outlet path 224, with the outlet fuel line 228 of the fuel delivery system 146 being fluidly connected to the liquid fuel outlet path 224, as will be explain in greater detail below. In such a manner, the outlet fuel line 228 may receive a deoxygenated flow of liquid fuel 230, as will also be described in greater detail below.

During typical operations, a stripping gas 232 flows from the gas outlet 218 of the first fuel gas separator 204, through the circulation gas flowpath 206 in a direction from the first fuel gas separator 204 to the contactor 202. More specifically, during typical operations, stripping gas 232 flows from the gas outlet 218 of the first fuel gas separator 204, through, for the embodiment depicted, a pre-heater 212 configured to add heat energy to the gas flowing therethrough, and to and through the catalyst 210. The stripping gas 232 then flows through the gas boost pump 208, wherein a pressure of the stripping gas 232 is increased to provide for the flow of the stripping gas 232 through the circulation gas flowpath 206. The relatively high pressure stripping gas 232 (i.e., relative to a pressure upstream of the boost pump 208 and the fuel entering the contactor 202) is then provided to the contactor 202, wherein the stripping gas 232 is mixed with a flow of liquid fuel 230 from the inlet fluid line 226 to generate a fuel gas mixture 229. The fuel gas mixture 229 generated within the contactor 202 is provided to the inlet 222 of the first fuel gas separator 204.

Generally, it will be appreciated that during operation of the fuel oxygen conversion unit 200, the liquid fuel 230 provided through the inlet fuel line 226 to the contactor 202 may have a relatively high oxygen content. The stripping gas 232 provided to the contactor 202 may have a relatively low oxygen content or other specific chemical structure. Within the contactor 202, the liquid fuel 230 is mixed with the stripping gas 232, resulting in the fuel gas mixture 229. As a result of such mixing a physical exchange may occur whereby at least a portion of the oxygen within the fuel 230 is transferred to the stripping gas 232, such that the fuel component of the mixture 229 has a relatively low oxygen content (as compared to the fuel 230 provided through inlet fuel line 226) and the stripping gas component of the mixture 229 has a relatively high oxygen content (as compared to the stripping gas 232 provided through the circulation gas flowpath 206 to the contactor 202).

Figure 3:
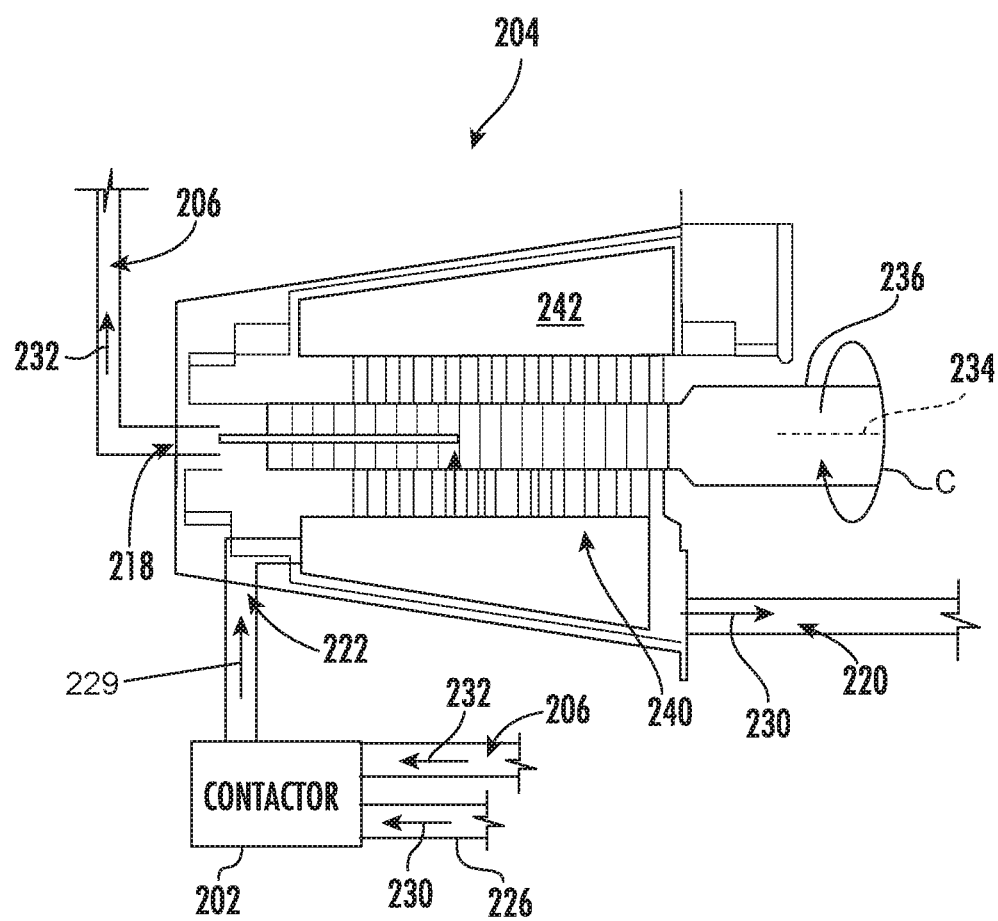
FIG. 3 is a schematic, close-up, cross-sectional view of a fuel gas separator of the exemplary fuel oxygen conversion unit of FIG. 2 in accordance with an exemplary embodiment of the present disclosure.

Referring now also briefly to FIG. 3, providing a close-up, schematic, cross-sectional view of the exemplary first fuel gas separator 204 of FIG. 2, it will be appreciated that within the first fuel gas separator 204 the relatively high oxygen content stripping gas 232 is generally separated from the relatively low oxygen content fuel 230. Specifically, for the embodiment shown, the first fuel gas separator 204 defines a central axis 234 and a circumferential direction C extending about the central axis 234. Additionally, the first fuel gas separator 204 is configured as a mechanically-driven fuel gas separator, or more specifically as a rotary/centrifugal fuel gas separator. Accordingly, the first fuel gas separator 204 includes an input shaft 236 and a separation assembly 238, the input shaft 236 mechanically coupled to the separation assembly 238, the two components together rotatable about the central axis 234. Further, the input shaft 236 may be mechanically coupled to, and driven by, e.g., the accessory gearbox (such as the exemplary accessory gearbox 142 of FIG. 1, as noted above). However, in other embodiments, the input shaft 236 may be mechanically coupled to any other suitable power source, such as an electric motor.

Additionally, the exemplary separation assembly 238 depicted generally includes an inner filter 240 arranged along the central axis 234, and a plurality of paddles 242 positioned radially outward of the inner filter 240. During operation, a rotation of the separation assembly 238 about the central axis 234, and more specifically, a rotation of the plurality of paddles 242 about a central axis 234 (i.e., in the circumferential direction C), may generally force heavier liquid fuel 230 outward and lighter stripping gas 232 inward through the inner filter 240. In such a manner, the liquid fuel 230 may exit through the liquid fuel outlet 220 of the first fuel gas separator 204 and the stripping gas 232 may exit through the stripping gas outlet 218 of the first fuel gas separator 204, as is indicated.

Accordingly, it will be appreciated that the liquid fuel 230 provided to the liquid fuel outlet 220, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 230 provided to the liquid fuel outlet 220 may an oxygen content of less than about five (5) parts per million ("ppm"), such as less than about three (3) ppm, such as less than about two (2) ppm, such as less than about one (1) ppm, such as less than about 0.5 ppm.

Referring now back to the schematic view of the fuel oxygen conversion unit 200 in FIG. 2, it will further be appreciated that the exemplary fuel oxygen conversion unit 200 recirculates and reuses the stripping gas 232 (i.e. the stripping gas 232 operates in a substantially closed loop). However, the stripping gas 232 exiting the first fuel gas separator 204, having interacted with the liquid fuel 226, has a relatively high oxygen content. Accordingly, in order to reuse the stripping gas 232, an oxygen content of the stripping gas 232 from the gas outlet 218 of the first fuel gas separator 204 needs to be reduced. For the embodiment depicted, as noted above, the stripping gas 232 flows through the pre-heater 212 to the catalyst 210 where the oxygen content of the stripping gas 232 is reduced, and subsequently to the gas boost pump 208 (it being appreciated that in other exemplary aspects, such components may be arranged in any other suitable order). More specifically, within the catalyst 210, the relatively oxygen-rich stripping gas 232 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 232 to reduce an oxygen content thereof. However, in other embodiments, the catalyst 210 may additionally, or alternatively, include geometries of catalytic components through which the relatively oxygen-rich stripping gas 232 flows to reduce an oxygen content thereof. In one or more of these configurations, a byproduct may be produced, such as water. The water, if produced, may be in vapor form and continue as part of the stripping gas 220. Alternatively, the water or other byproduct, if produced, may be ducted away from the catalyst 210 (duct not depicted in the embodiment of FIG. 2). In one or more of these embodiments, the catalyst 210 may be configured to reduce an oxygen content of the stripping gas 220 to less than about three percent (3%) oxygen (O2) by mass, such less than about one percent (1%) oxygen (O2) by mass.

The resulting relatively low oxygen content gas is then provided through the remainder of the circulation gas flowpath 206 and back to the contactor 202, such that the cycle may be repeated. In such a manner, it will be appreciated that the stripping gas 232 may be any suitable gas capable of undergoing the chemical transitions described above. For example, the stripping gas may be air from, e.g., a core air flowpath of a gas turbine engine including the fuel oxygen conversion unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), a gas mixture made up of at least 50% by mass inert gas, or some other gas or gas mixture having a relatively low oxygen content.

Briefly, it will also be appreciated that the exemplary fuel oxygen conversion unit 200 depicted includes a makeup gas source 244 fluidly connected to the circulation gas flowpath 206. The makeup gas source 244 may be any suitable gas source. For example, in certain embodiments, the makeup gas source 244 may be a compressor section of a gas turbine engine including the fuel oxygen conversion unit 200, such as high pressure compressor 112 of such compressor section (see FIG. 1). Additionally, or alternatively, the makeup gas source 244 may be a gas tank 272 located within the gas turbine engine, or alternatively, located remotely from the gas turbine engine, such as within the aircraft. For the embodiment depicted, the makeup gas source 244 is in airflow communication with the circulation gas flowpath 206 through a variable flow valve 246, which may be actuatable to supply additional gas to the circulation gas flowpath 206 as needed. Although not depicted, the fuel oxygen conversion unit 200 may include one or more sensors for determining an airflow volume/flowrate through the circulation gas flowpath 206 to determine an amount of, if any, makeup gas that is needed. Notably, however, as mentioned above, in other embodiments the fuel oxygen conversion unit 200 may include an open loop stripping gas path, such that the stripping gas is not reused by the turbofan engine 100 and instead is, e.g., provided to atmosphere. In such an embodiment, the makeup gas source 244 may be the stripping gas source.

It will be appreciated, however, that despite the inclusion of the first fuel gas separator 204, it may be possible for a portion of stripping gas 232 to remain in the liquid fuel 230 provided through the liquid fuel outlet 220 of the first fuel gas separator 204 and to the liquid fuel outlet path 224 in an amount greater than a minimally acceptable amount. For example, when relatively high amounts of gas, such as stripping gas 232, are present in the liquid fuel 230 provided through the liquid fuel outlet path 224 to the fuel delivery system 146, and on to a combustion section of an engine including the fuel oxygen conversion unit 200, undesirable results may occur. For example, such may result in undesirable combustor dynamics, efficiencies, etc.

Accordingly, for the exemplary embodiment depicted in FIG. 2, in addition to the first fuel gas separator 204, the fuel oxygen conversion unit 200 further includes a second fuel gas separator 248. The second fuel gas separator 248 is positioned in fluid communication with the liquid fuel outlet path 224 at a location downstream of the first fuel gas separator 204, and more specifically, is positioned in the liquid fuel outlet path 224 at a location downstream of the first fuel gas separator 204.

Similar to the first fuel gas separator 204, the second fuel gas separator 248 defines an inlet 250, a liquid fuel outlet 252, and a stripping gas outlet 254. The inlet 250 is configured to receive a flow of (mostly) liquid fuel 230 from the liquid fuel outlet 220 of the first fuel gas separator 204. The liquid fuel outlet 252 of the second fuel gas separator 248 is configured to provide liquid fuel 230 to the outlet fuel line 228 of the fuel delivery system 146. Further, the stripping gas outlet 254 of the second fuel gas separator 248 is in fluid communication with the circulation gas flowpath 206 for providing separated stripping gas 232 back to the circulation gas flowpath 206. More specifically, the second fuel gas separator 248 includes a return conduit 256, for the embodiment depicted, extending between the stripping gas outlet 254 of the second fuel gas separator 248 and the circulation gas flowpath 206. For the embodiment shown, a valve 258 is provided at a juncture between return conduit 256 and the circulation gas flowpath 206. The valve 258 may be a three-way valve for reintroducing the separated stripping gas 232 flowing through the return conduit 256 to the circulation gas flowpath 206. For example, the valve 258 may include a check valve for ensuring proper directional fluid flow. Notably, however, in other embodiments, the valve 258 may be positioned elsewhere for performing such function (such as upstream of the juncture within the return conduit 256).

From FIG. 2, it will be appreciated that for the embodiment shown, the second fuel gas separator 248 is a mechanically-driven fuel gas separator 204. For example, the second fuel gas separator 248 may be a rotary separator, similar to the first fuel gas separator 204. For example, as is depicted in schematically in phantom in FIG. 2, the second fuel gas separator 248 may include one or more paddles 260 configured to rotate about a central axis 268 and a radially inner filter 262. During operation/rotation, relatively heavy liquid fuel 230 may be centrifuged outward to the liquid fuel outlet 252 of the second fuel gas separator 248, while relatively light gas 232 may flow through the filter 262 and stripping gas outlet 218, to and through the return conduit 256 of the second fuel gas separator 248 back to the circulation gas flowpath 206.

However, in other embodiments, the second fuel gas separator 248 may be any other suitable mechanically-driven fuel gas separator.

As is also depicted in FIG. 2, for the embodiment shown, the second fuel gas separator 248 is mechanically coupled to, and rotatable with, the first fuel gas separator 204 through a connection shaft 264. In such a manner, it will be appreciated that the second fuel gas separator 248 is driven by the same power source driving the first fuel gas separator 204 (i.e., pad 216 for the embodiment depicted).

In such a manner, it will be appreciated that an amount of gas 232 present in the deoxygenated liquid fuel 230 returned to the fuel delivery system 146 through the liquid fuel outlet 252 of the second fuel gas separator 248 may be reduced (as compared to upstream of the second fuel gas separator 248), such that an engine including the fuel oxygen conversion unit 200 may run in a less problematic and more efficient manner.

It will be appreciated, however, that in other exemplary embodiments, the fuel oxygen conversion unit 200 may include any other suitable combination of first fuel gas separator 204 and second fuel gas separator 248 in series flow. For example, in other exemplary embodiments, one or both of the first fuel gas separator 204 or second fuel gas separator 248 may be a passive separator (i.e., a separator that does not require a mechanical input), such as a gravity separator (i.e., a gravity-assisted fuel gas separator).

Figure 4:
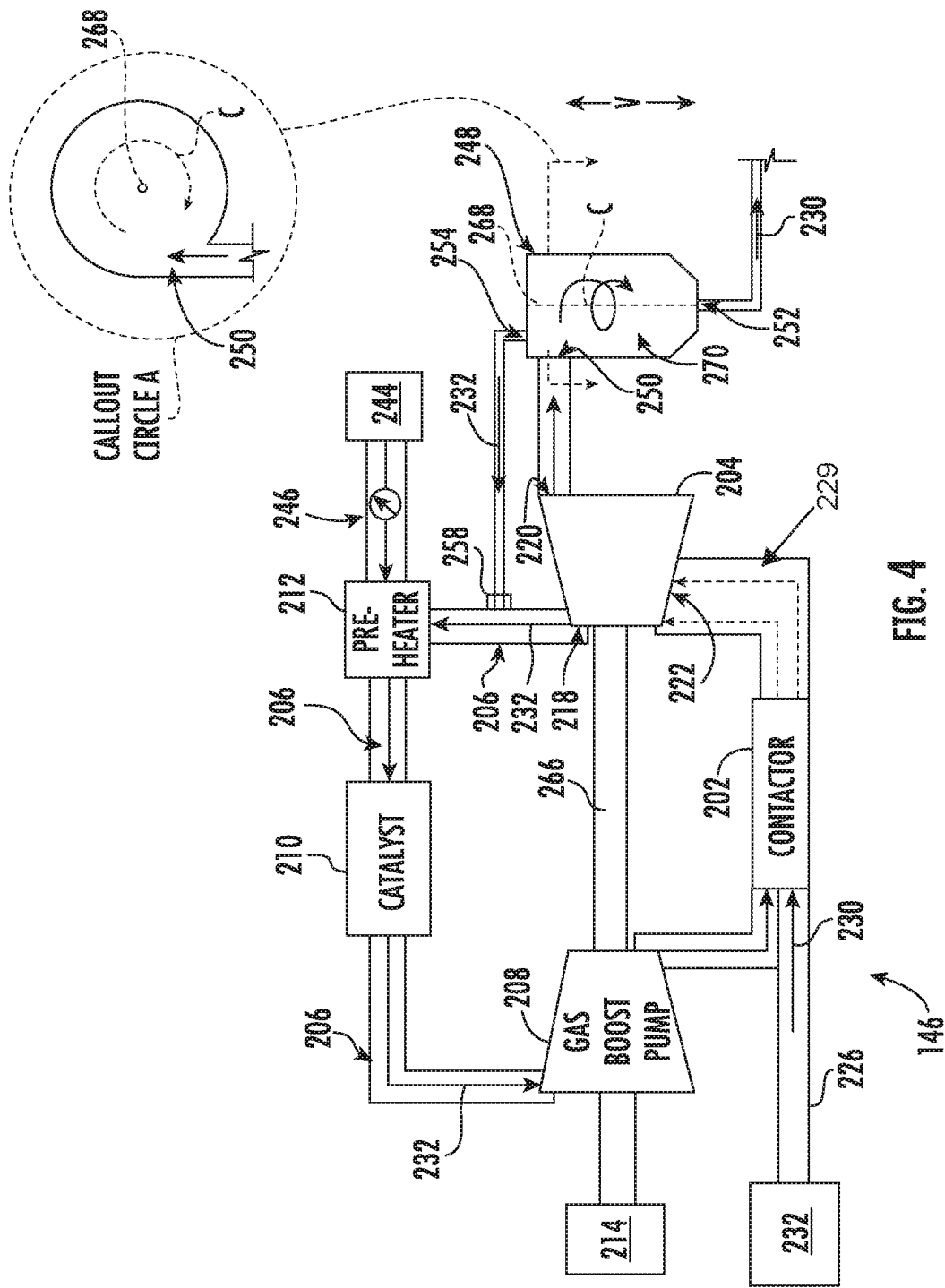
FIG. 4 is a schematic, cross-sectional view of a fuel oxygen conversion unit in accordance with another exemplary embodiment of the present disclosure.
Figure 5:
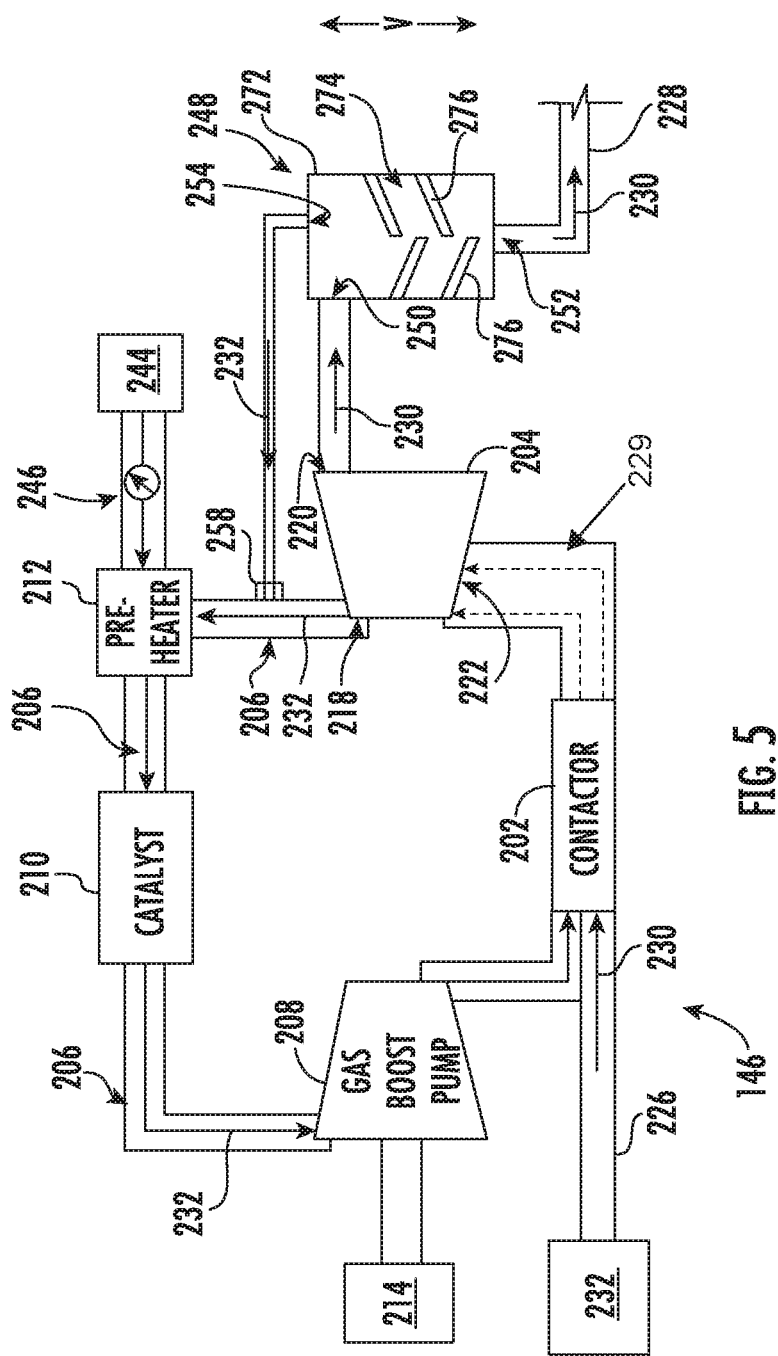
FIG. 5 is a schematic, cross-sectional view of a fuel oxygen conversion unit in accordance with yet another exemplary embodiment of the present disclosure.
Figure 6:
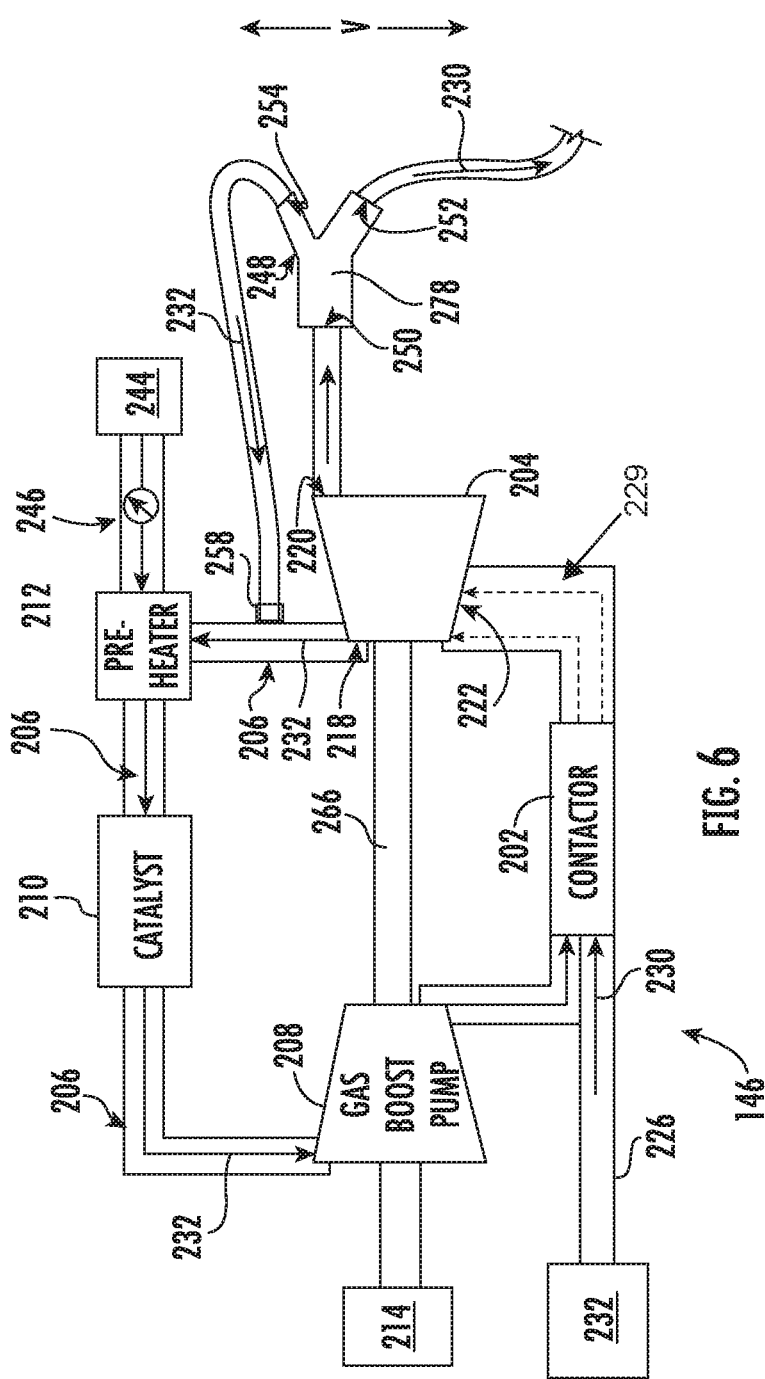
FIG. 6 is a schematic, cross-sectional view of a fuel oxygen conversion unit in accordance with still another exemplary embodiment of the present disclosure.

For example, referring now generally to FIGS. 4 through 6 various additional exemplary embodiments of the present disclosure are depicted. More specifically, each of the exemplary embodiments of FIGS. 4 through 6 depict a fuel oxygen conversion unit 200 in accordance with other exemplary embodiments of the present disclosure. Each of the embodiments depicted in FIGS. 4 through 6 may be configured in substantially the same manner as the exemplary embodiment described above with reference to FIGS. 2 and 3.

Accordingly, for example, each of the exemplary fuel oxygen conversion units 200 of FIGS. 4 through 6 generally includes a contactor 202, a pre-heater 212, a catalyst 210, a gas boost pump 208, a first fuel gas separator 204, and a second fuel gas separator 248. Moreover, the exemplary fuel oxygen conversion unit 200 generally defines a circulation gas flowpath 206 from the first fuel gas separator 204 to the contactor 202, with for the embodiments depicted in FIGS. 4 through 6, the pre-heater 212, catalyst 210, and gas boost pump 208 positioned within, or otherwise fluidly connected to, the circulation gas flowpath 206.

Notably, however, by contrast to the exemplary embodiment described above, for the exemplary fuel oxygen conversion units 200 of FIGS. 4 through 6, the gas boost pump 208 and first fuel gas separator 204 are mechanically coupled through a mechanical connection 266, such that the gas boost pump 208 is rotatable with the fuel gas separator 204. In such a manner, the gas boost pump 208 and the first fuel gas separator 204 are each coupled to, and driven by, the same power source. For the embodiment depicted, the power source is a pad 214 of an accessory gearbox, however, in other embodiments, any other suitable power source may be utilized (e.g., an electric motor).

Further, it will be appreciated that for the embodiments of FIGS. 4 through 6, the first fuel gas separator 204 is again configured as a mechanically-driven fuel gas separator 204, such as a mechanically-driven rotary separator (see, e.g., FIGS. 2 and 3). By contrast, however, for the exemplary embodiments depicted in FIGS. 4 through 6, the second fuel gas separator 248 is, instead, configured as a gravity-assisted, passive fuel gas separator (i.e., the fuel 230 and gas 232 separation is achieved through means other than mechanical power input).

For example, referring particularly to FIG. 4, for the embodiment depicted, the second fuel gas separator 248 is a cyclonic separator. The cyclonic separator, for the embodiment of FIG. 4, generally defines a vertical direction V, an axis 268 extending generally along the vertical direction V, and a circumferential direction C extending about the axis 268. As discussed above, the second fuel gas separator 248/cyclonic separator for the embodiment of FIG. 4 generally defines an inlet 250. The (mostly) liquid fuel 230 from the liquid fuel outlet path 224, provided from the fuel outlet 220 of the first fuel gas separator 204, enters the cyclonic separator through the inlet 250, swirls around an interior cavity 270 of the cyclonic separator generally in a circumferential direction C and downward along the vertical direction V. Specifically, as may be seen in the cross-sectional view of the Callout Circle A, the inlet 250 is a substantially tangential inlet (i.e., defining an inlet direction substantially parallel to a tangent of the circumferential direction C), inducing the swirl of the liquid fuel 230 within the interior cavity 270 of the second fuel gas separator 248. The swirling motion effectively centrifuges the relatively heavy liquid fuel 230 radially outward (relative to the axis 268) and downward along the vertical direction V, while the relatively light gas/stripping gas 232, moves radially inward towards the central axis 268 and upwardly along the vertical direction V to the stripping gas outlet 254 of the second fuel gas separator 248/cyclonic separator. In such a manner, an additional amount of stripping gas 232 may be removed from the liquid fuel 230 provided through the fuel outlet path 224 to the outlet fuel line 228 of the fuel delivery system 146.

It should be appreciated, however, that in other embodiments the cyclonic separator may not be gravity-assisted. For example, in other embodiments the cyclonic separator may not be oriented generally along the vertical direction V, and instead may rely on a flow pressure of the liquid fuel 230 to create the swirling motion utilized for the separation of the stripping gas 232 from the liquid fuel 230.

Referring now particularly to FIG. 5, for the embodiment depicted, the second fuel gas separator 248 is instead a tank 272 or tank separator. The exemplary tank 272 of FIG. 5 defines a vertical direction V, an inlet 250, a stripping gas outlet 254, and a liquid fuel outlet 252. The inlet 250 is configured to receive (mostly) liquid fuel 230 from the liquid fuel outlet path 224, provided by the first fuel gas separator 204, or rather, the liquid fuel outlet 220 of the first fuel gas separator 204. Additionally, the stripping gas outlet 254 is in airflow communication with the circulation gas flowpath 206 through a return conduit 256, and the liquid fuel outlet 252 is fluidly connected to the outlet fuel line 228 of the fuel delivery system 146. For the embodiment depicted, the stripping gas outlet 254 is positioned above the liquid fuel outlet 252 along the vertical direction V. More specifically, for the embodiment depicted, the stripping gas outlet 254 is positioned substantially at a top end of the tank 272 (along the vertical direction V) and the liquid fuel outlet 252 is positioned substantially at a bottom end of the tank 272 (along the vertical direction V). In such a manner, the relatively heavy liquid fuel 230 may fall to the bottom end of the tank 272, and through the liquid fuel outlet 252 of the tank 272, while the relatively light gas/stripping gas 232 may rise to the top end of the tank 272, and through the stripping gas outlet 254 of the tank 272.

Referring still to FIG. 5, for the embodiment depicted the tank 272 further defines an interior 274 and one or more baffles 276. More specifically, the exemplary tank 272 depicted includes four baffles 276 positioned within the interior 274 of the tank 272. Of course in other embodiments, any other suitable number of baffles 276 may be included. Notably, the baffles 276 slant downwardly along the vertical direction V (as they extend inward) for the embodiment shown. Additionally, it will be appreciated that the liquid fuel outlet 252 of the tank 272 is positioned below at least one of the one or more baffles 276 of the tank 272 along the vertical direction V, and more specifically, is positioned below each of the one or more baffles 276 of the tank 272 along vertical direction V. The baffles 276 may reduce a "sloshing" around of the liquid fuel 230 within the interior 274 of the tank 272 during, e.g., one or more maneuvers of an aircraft including a gas turbine engine having the exemplary fuel oxygen conversion unit 200 of FIG. 5. Such may reduce or prevent additional air or gas being incorporated into the liquid fuel 230 within the tank 272, and provided through the outlet 252 of the tank 272.

In will be appreciated that the tank 272 may have any suitable size and/or shape. For example, in at least one exemplary embodiment, the tank 272 may be a substantially cylindrical tank. However, in other embodiments, the tank 272 may have any other suitable configuration.

Referring now particularly to FIG. 6, for the embodiment depicted the second fuel gas separator 248 is instead a split pipe separator, and more specifically, a Y-pipe 278. The Y-pipe 278 of FIG. 6 generally defines an inlet 250, a stripping gas outlet 254, and a liquid fuel outlet 252. The inlet 250 is configured to receive (mostly) liquid fuel 230 from the liquid fuel outlet path 224, provided by the first fuel gas separator 204, or rather, the liquid fuel outlet 220 of the first fuel gas separator 204. Additionally, the stripping gas outlet 254 is in airflow communication with the circulation gas flowpath 206 through a return conduit 256, and the liquid fuel outlet 252 is fluidly connected to the outlet fuel line 228 of the fuel delivery system 146. For the embodiment depicted, the liquid fuel outlet 252 is positioned below the stripping gas outlet 254 along the vertical direction V. In such a manner, the relatively heavy liquid fuel 230 may exit through the liquid fuel outlet 252 of the Y-pipe 278, while the relatively light gas/stripping gas 232 may rise and exit through the stripping gas outlet 254 of the Y-pipe 278.

It will be appreciated, however, that in still other exemplary embodiments, any other suitable configuration may be provided. For example, in other embodiments, the first fuel gas separator 204, the second fuel gas separator 248, or both may have any other suitable gravity-assisted configuration, mechanically-driven configuration, etc. Further, although for the embodiment depicted two fuel gas separators 204, 248 are provided in series, in other embodiments, the fuel oxygen conversion unit 200 may additionally include any other suitable number of additional fuel gas separators. Moreover, in other exemplary embodiments, it will be appreciated that the remaining components of the fuel oxygen conversion unit 200 may have any other suitable configuration for reducing an oxygen level of a liquid fuel 230 provided thereto. For example, in other embodiments, the gas boost pump 208, the catalyst 210, the contactor 202, etc. may have any other suitable configuration, may be arranged in any other suitable order or arrangement, etc. Additionally, other exemplary fuel oxygen conversion units 200 may have components or features not described herein, or may not include each of the components or features described Inclusion of a fuel oxygen conversion unit 200 or vehicle or engine of a vehicle having a first fuel gas separator 204 and a second fuel gas separator 248 arranged in series may result in a deoxygenated fuel 230 being provided to the engine with a reduced amount of stripping gas 232, or other gas, therein such that the engine may operate, e.g., more efficiently.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel oxygen conversion unit for a vehicle or an engine of the vehicle, the fuel oxygen conversion unit comprising:
   a contactor;
   a mechanically-driven, first fuel gas separator comprising an input shaft, the input shaft configured to rotate about an axis, the first fuel gas separator defining a liquid fuel outlet and a stripping gas outlet, the fuel oxygen conversion unit defining a liquid fuel outlet path in fluid communication with the liquid fuel outlet of the first fuel gas separator;
   a second fuel gas separator positioned in fluid communication with the liquid fuel outlet path at a location downstream of the first fuel gas separator; and
   a power source;
   wherein the second fuel gas separator is a mechanically-driven fuel gas separator, and
   wherein the first fuel gas separator and the second fuel gas separator are each driven by the power source.

2. The fuel oxygen conversion unit of claim 1, wherein the fuel oxygen conversion unit further defines a circulation gas flowpath in fluid communication with the stripping gas outlet of the first fuel gas separator and extending from the first fuel gas separator to the contactor, wherein the second fuel gas separator defines a liquid fuel outlet and a stripping gas outlet, wherein the stripping gas outlet of the second fuel gas separator is in fluid communication with the circulation gas flowpath.

3. The fuel oxygen conversion unit of claim 1, wherein the first fuel gas separator is a rotary separator.

4. The fuel oxygen conversion unit of claim 1, wherein the second fuel gas separator is mechanically coupled to, and rotatable with, the first fuel gas separator.

5. The fuel oxygen conversion unit of claim 1, wherein the second fuel gas separator is a cyclonic separator.

6. The fuel oxygen conversion unit of claim 1, wherein the second fuel gas separator comprises a tank defining a vertical direction, wherein the tank defines a stripping gas outlet and liquid fuel outlet, wherein the stripping gas outlet is positioned above the liquid fuel outlet along the vertical direction.

7. The fuel oxygen conversion unit of claim 6, wherein the tank defines an interior and comprises one or more baffles positioned within the interior.

8. The fuel oxygen conversion unit of claim 7, wherein the liquid fuel outlet is positioned below at least one of the one or more baffles of the tank along the vertical direction.

9. The fuel oxygen conversion unit of claim 1, wherein the fuel oxygen conversion unit further defines a circulation gas flowpath in fluid communication with the stripping gas outlet of the first fuel gas separator and extending from the first fuel gas separator to the contactor, and wherein the fuel oxygen conversion unit further comprises:
 a gas boost pump positioned in the circulation gas flowpath; and
 a catalyst positioned in the circulation gas flowpath.

10. The fuel oxygen conversion unit of claim 9, wherein the gas boost pump is mechanically coupled to, and rotatable with, the first fuel gas separator.

11. The fuel oxygen conversion unit of claim 1, wherein the fuel oxygen conversion unit further defines a circulation gas flowpath in fluid communication with the stripping gas outlet of the first fuel gas separator and extending from the first fuel gas separator to the contactor, wherein the fuel oxygen conversion unit further comprises a gas boost pump positioned in the circulation gas flowpath, and wherein a stripping gas outlet of the second fuel gas separator is in fluid communication with the circulation gas flowpath at a location upstream of the gas boost pump.

12. A fuel oxygen conversion unit for a vehicle or an engine of the vehicle, the fuel oxygen conversion unit comprising:
 a contactor;
 a mechanically-driven, first fuel gas separator comprising an input shaft, the input shaft configured to rotate about an axis, the first fuel gas separator defining a liquid fuel outlet and a stripping gas outlet, the fuel oxygen conversion unit defining a liquid fuel outlet path in fluid communication with the liquid fuel outlet of the first fuel gas separator; and
 a second fuel gas separator positioned in fluid communication with the liquid fuel outlet path at a location downstream of the first fuel gas separator;
 wherein the fuel oxygen conversion unit further defines a circulation gas flowpath in fluid communication with the stripping gas outlet of the first fuel gas separator and extending from the first fuel gas separator to the contactor, and wherein the fuel oxygen conversion unit further comprises a gas boost pump positioned in the circulation gas flowpath; and
 wherein a stripping gas outlet of the second fuel gas separator is in fluid communication with the circulation gas flowpath at a location upstream of the gas boost pump.

13. The fuel oxygen conversion unit of claim 12, further comprising:
 a power source;
 wherein the second fuel gas separator is a mechanically-driven fuel gas separator, and
wherein the first fuel gas separator and the second fuel gas separator are each driven by the power source.

14. The fuel oxygen conversion unit of claim 12, wherein the second fuel gas separator is mechanically coupled to, and rotatable with, the first fuel gas separator.

15. An engine comprising:
 a combustion section;
 a fuel delivery system in fluid communication with the combustion section for providing fuel to the combustion section; and
 a fuel oxygen conversion unit in fluid communication with the fuel delivery system, the fuel oxygen conversion unit comprising
  a contactor defining an inlet in fluid communication with the fuel delivery system;
  a first fuel gas separator comprising an input shaft, the input shaft configured to rotate about an axis, the first fuel gas separator, wherein the first fuel gas separator defines a liquid fuel outlet and a stripping gas outlet, the fuel oxygen conversion unit defining a circulation gas flowpath in fluid communication with the stripping gas outlet of the first fuel gas separator and extending from the first fuel gas separator to the contactor, and further defining a liquid fuel outlet path in fluid communication with the liquid fuel outlet of the first fuel gas separator and the fuel delivery system;
  a second fuel gas separator positioned in fluid communication with the liquid fuel outlet path at a location downstream of the first fuel gas separator; and
  a power source;
  wherein the second fuel gas separator is a mechanically-driven fuel gas separator,
 and wherein the first fuel gas separator and the second fuel gas separator are each driven by the power source.

16. The engine of claim 15, wherein the fuel oxygen conversion unit further defines a circulation gas flowpath in fluid communication with the stripping gas outlet of the first fuel gas separator and extending from the first fuel gas separator to the contactor, wherein the second fuel gas separator defines a liquid fuel outlet and a stripping gas outlet, wherein the stripping gas outlet of the second fuel gas separator is in fluid communication with the circulation gas flowpath.

17. The engine of claim 15, wherein the second fuel gas separator is a cyclonic separator.

18. The engine of claim 15, wherein the second fuel gas separator comprises a tank defining a vertical direction, wherein the tank defines a stripping gas outlet and liquid fuel outlet, wherein the stripping gas outlet is positioned above the liquid fuel outlet along the vertical direction.

19. The engine of claim 15, wherein the fuel oxygen conversion unit further defines a circulation gas flowpath in fluid communication with the stripping gas outlet of the first fuel gas separator and extending from the first fuel gas separator to the contactor, and wherein the fuel oxygen conversion unit further comprises a gas boost pump positioned in the circulation gas flowpath and a catalyst positioned in the circulation gas flowpath.

20. The engine of claim 19, wherein the gas boost pump is mechanically coupled to, and rotatable with, the first fuel gas separator.

* * * * *